A. G. CATELAIN.
HOSE CLAMP.
APPLICATION FILED OCT. 28, 1910.
991,769.
Patented May 9, 1911.
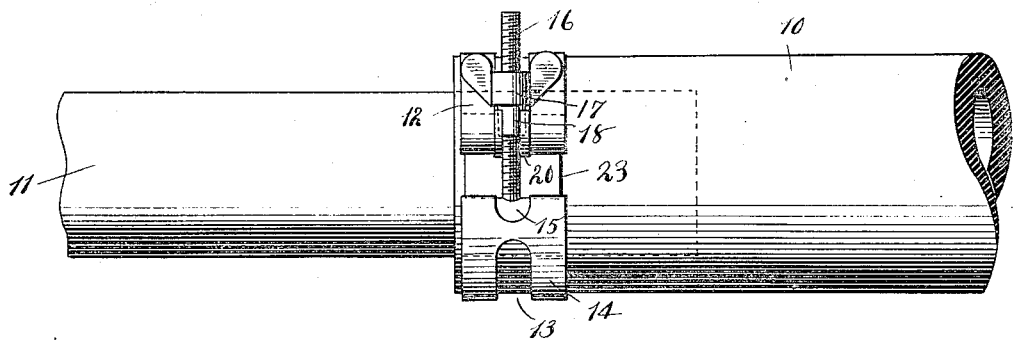
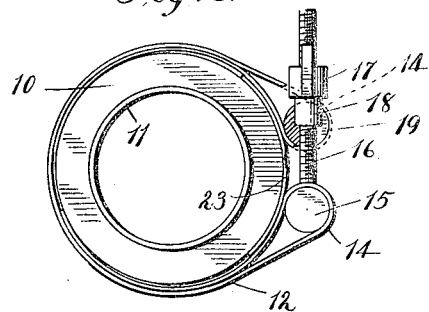
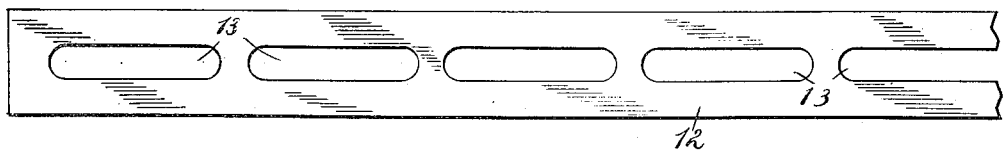
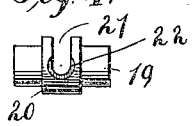
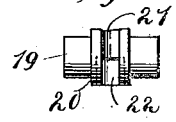
Witnesses:
C. F. Barrett
M. A. Milord
Inventor
Andre G. Catelain
By Frederick Benjamin
Atty.

UNITED STATES PATENT OFFICE.

ANDRE G. CATELAIN, OF CHICAGO, ILLINOIS.

HOSE-CLAMP.

991,769.   Specification of Letters Patent.   Patented May 9, 1911.

Application filed October 28, 1910. Serial No. 589,513.

*To all whom it may concern:*

Be it known that I, ANDRE G. CATELAIN, citizen of the Republic of France, residing at Chicago, in the county of Cook and State of Illinois, have invented certain new and useful Improvements in Hose-Clamps, of which the following is a specification.

My invention relates to clamping devices and has particular reference to means for attaching elastic hose to a pipe or nozzle, being also adapted to be used for coupling the ends of two sections of hose together by clamping them upon a connecting pipe or nipple.
The chief objects of the improvements which constitute the subject matter of this application for patent are:—to provide a band clamp that can be readily applied to a hose and firmly secured thereto with sufficient pressure to form an effective connection, and to produce a strong, simple and effective clamp that will insure a close contact throughout the entire circumference of the embracing member.
An important feature of my invention is the advantage to be derived from the special form of the clamping band employed, which is intended to be furnished in rolls from which the desired sections required for a given coupling may be readily cut, so that the device will be convenient for clamping hose of any size. The bands which I use are made of uniform size throughout their entire length, requiring no special forming except to produce a series of longitudinal spaced slots which render the band more flexible when of a given gage, and facilitate the location of the clamping mechanism at practically any place in the band, thus conducing to economy in the manufacture and use of this part of the clamp.

I accomplish the above and other desirable results by employing the devices illustrated in the accompanying drawing which forms a part of this application, and in which the details of construction are disclosed in the following views:—

Figure 1 is a side elevation of a pipe and attached hose to which my improved band clamp is applied; Fig. 2 is an end view of the structures shown in Fig. 1; Fig. 3 is a plan view of a portion of the band strip; Figs. 4 and 5 are views showing the tensioning lug, seen from different directions, and Fig. 6 is a detail showing the T-bolt and attachments.

Referring to the details of the drawing, the numeral 10 indicates a section of hose engaging the end of a pipe 11, and embracing the end of the hose is a clamping band 12, consisting of a comparatively thin metal strip or ribbon of uniform width and thickness. This band is furnished with suitable slots 13, arranged at spaced intervals along the median line. The ends of the band are folded or doubled back upon the main portion forming attaching eyes or loops 14. One of said loops is engaged by the head 15 of a T-bolt 16, the body of which projects through one of the slots 13 in the band 12, and is provided with a wing thumb nut 17. Slidably mounted on the bolt beneath the nut is a washer in the form of a sleeve 18. The other eye or loop 14 is engaged by a cylindrical lug 19 having its ends reduced to fit the loop, the central portion 20, thus left of full diameter to form an integral collar, which projects through a slot in the band and prevents the lug from becoming displaced when the bolt is removed. The collar 20 is furnished with a slot or notch 21 to receive the stem of the bolt 16.

To apply this clamping device a band is provided of sufficient length to nearly twice encircle the hose at the point of application, and the ends doubled over to form the loops 14. The lug 19 is inserted in one of said loops so that the collar 20 will engage a slot 13 and the head of the bolt made to engage the opposite loop as shown. The body of the bolt is then placed in the slot in the said collar, and the nut screwed down against the washer which passes through the slot 13 and engages an annular recess or seat 22 formed in the said collar 20. It will be readily seen that the band can be clamped firmly upon the hose by further turning the thumb nut. In order to bridge over the gap between the loops 14, a bearing plate 23 is placed beneath the band at this point, thus insuring an even pressure at every point around the periphery of the hose.

It will be seen that it will not be necessary to unscrew the nut entirely from the bolt when removing the clamp, as the bolt can be swung upon its pivoted head to release it from its engagement with the lug 19 by loosening the nut sufficiently to permit the washer to become disengaged from its seat.

Other ways of applying my improved band clamp will be readily suggested to one skilled in the art. For instance, one band may be applied over a hole in a hose or pipe either with or without an intervening plate or patch, thus effectually closing a leak or break.

Having thus described my invention what I claim as new, is:—

1. In a hose clamp, the combination of a slotted band having its ends folded over to form loops, a T-bolt engaging one of said loops, a lug removably engaging the other loop, a notch in said lug adapted to receive the body of said bolt, and a clamping nut on said bolt adapted to engage said lug.

2. In a hose clamp, the combination of a flexible slotted band having its ends bent to form loops, a bolt having a cross head engaging one of said loops, a lug engaging the opposite loop, a slot in said lug adapted to receive the body of said bolt, a clamping nut on said bolt, and a washer on said bolt adapted to project through one of the slots in the band and engage a suitable seat in said lug.

3. In a hose clamp, the combination of a band provided with a series of longitudinally arranged spaced slots, and having its ends folded to form attaching loops, a bolt having a cross head engaging one of said loops, a lug engaging the other loop, a collar on said lug engaging a slot in the band, a notch in said collar adapted to receive the body of said bolt, a nut on the bolt, a washer for the said nut adapted to project through a slot in said band and engage said lug, and a bearing plate arranged beneath said band.

4. In a hose-clamp, a strip of flat flexible material having a plurality of openings formed therein and bent to form an encircling band, the ends of said strip being free and arranged on the under side of the body of the band, and means for drawing together the ends of said band, said means comprising a bolt detachably connected with said band, and a nut mounted on said bolt.

5. In a hose-clamp, a strip of flat flexible material having a plurality of openings therein and bent to form a hose encircling band terminating in loops with the ends of said strip free, and means for connecting said loops, said means comprising devices engaging said loops, a bolt engaging said devices and a nut threaded on said bolt.

In testimony whereof I affix my signature in the presence of two witnesses.

ANDRE G. CATELAIN.

Witnesses:
H. DE LOS HIGMAN,
M. A. MILORD.